(12) United States Patent
Richmond et al.

(10) Patent No.: US 8,006,360 B2
(45) Date of Patent: Aug. 30, 2011

(54) METHOD FOR MANUFACTURING ENHANCED FOAM THERMOPLASTIC PRODUCTS

(75) Inventors: James R. Richmond, Franklinton, NC (US); Andrew C. Yiannaki, Raleigh, NC (US); Ivan I. Sobran, Raleigh, NC (US); Randal L. Henderson, Zebulon, NC (US)

(73) Assignee: Nomaco, Inc., Zebulon, NC (US)

( * ) Notice: Subject to any disclaimer, the term of this patent is extended or adjusted under 35 U.S.C. 154(b) by 882 days.

(21) Appl. No.: 12/008,448

(22) Filed: Jan. 10, 2008

(65) Prior Publication Data

US 2008/0178445 A1 Jul. 31, 2008

Related U.S. Application Data

(60) Provisional application No. 60/881,311, filed on Jan. 18, 2007.

(51) Int. Cl.
*B68G 7/00* (2006.01)
*B29C 44/56* (2006.01)

(52) U.S. Cl. .................. 29/91.1; 29/91.7; 5/263; 5/716

(58) Field of Classification Search ............. 29/91–91.8, 29/509–530; 5/263, 716, 717, 740
See application file for complete search history.

(56) References Cited

U.S. PATENT DOCUMENTS

| 4,256,797 | A | * | 3/1981 | Stamper et al. ................ 428/215 |
| 4,411,280 | A | * | 10/1983 | Floyd et al. .................... 131/332 |
| 5,687,439 | A | * | 11/1997 | Wagner ............................. 5/717 |
| 5,724,686 | A | * | 3/1998 | Neal ................................. 5/717 |
| 5,787,532 | A | * | 8/1998 | Langer et al. ..................... 5/717 |
| 6,023,803 | A | * | 2/2000 | Barman ............................. 5/716 |
| 6,659,020 | B1 | * | 12/2003 | Ball .......................... 108/57.28 |
| 6,702,391 | B1 | * | 3/2004 | Stipek ...................... 297/452.65 |
| 6,877,540 | B2 | * | 4/2005 | Barman et al. ................. 156/497 |
| 6,966,091 | B2 | * | 11/2005 | Barber ............................. 5/716 |
| 7,185,379 | B2 | * | 3/2007 | Barman ............................. 5/717 |
| 7,636,971 | B2 | * | 12/2009 | DeMoss ............................ 5/716 |
| 7,655,296 | B2 | * | 2/2010 | Haas et al. ................. 428/319.3 |
| 7,845,036 | B2 | * | 12/2010 | Rinchetti ........................... 5/739 |
| 2004/0032156 | A1 | * | 2/2004 | Stipek ...................... 297/452.18 |
| 2005/0019549 | A1 | * | 1/2005 | Tai et al. .................... 428/315.9 |
| 2006/0260062 | A1 | * | 11/2006 | Barman et al. ..................... 5/717 |
| 2007/0232176 | A1 | * | 10/2007 | Cashin et al. ................. 442/381 |
| 2008/0023895 | A1 | * | 1/2008 | Fossati ........................... 267/106 |
| 2008/0138553 | A1 | * | 6/2008 | Lauer et al. ................. 428/36.5 |

* cited by examiner

*Primary Examiner* — Derris H Banks
*Assistant Examiner* — Kaying Kue
(74) *Attorney, Agent, or Firm* — Withrow & Terranova, PLLC

(57) ABSTRACT

By providing a unique product enhancing step which enables any desired section, portion, or element of a product being produced to be treated in a manner to provide desired enhanced physical, structural, and/or aesthetics characteristics, a new, fully integrated enhanced foam manufacturing system is attained which is capable of producing virtually any desired foam product, with each product incorporating any desired area or zone being formed with a particular physical, structural, and/or aesthetic property, characteristic, or enhancement. In addition, in accordance with the teaching of the present invention, any desired cross-sectional shape or configuration is capable of being manufactured in fully automated, high volume, rapid production conditions, with virtual ease and simplicity, with a specific physical, structural, or aesthetic property incorporated therein.

8 Claims, 5 Drawing Sheets

METHOD FOR MANUFACTURING ENHANCED FOAM THERMOPLASTIC PRODUCTS

RELATED APPLICATIONS

This application is related to U.S. Provisional Patent Application Ser. No. 60/881,311, filed Jan. 18, 2007 entitled METHOD FOR MANUFACTURING ENHANCED FOAM THERMOPLASTIC PRODUCTS.

TECHNICAL FIELD

This invention relates to foamed thermoplastic products and to methods for manufacturing such products and, more particularly, to manufacturing foamed thermoplastic products constructed with specifically desired physical and structural attributes which are individually controllable during the manufacturing operation.

BACKGROUND ART

During the last few decades, substantial effort has been expended and interest has developed in the formation and construction of products using foamed thermoplastic materials. Furthermore, substantial attention has been paid to the production of products from foam thermoplastic materials for enhancing products and improving the construction and manufacturing expenses incurred for such products. In view of the highly competitive manufacturing costs that have been realized from the use of foam plastic materials, the demand for foam plastic materials has increased, with substantial commercial pressure being created for improved and enhanced profile shapes, configurations and inherent attributes.

Typically, products are formed either by foam extrusion or molding. However, regardless of which method is employed, production limitations exist on the size and shape in which products can be efficiently produced at competitive prices. Furthermore, limitations exist on the physical attributes which the resulting products possess due to the materials employed during the production operation.

As the desire and demand continues to increase for incorporating thermoplastic foam profiles in a wide variety of diverse products, the configurations required for the thermoplastic foam profiles becomes increasingly varied and diverse. However, due to the manufacturing methods which exist for creating thermoplastic foam profiles in the most efficient and cost effective manner, limitations exist on the profile constructions and/or configurations which are capable of being achieved. As a result, various products where thermoplastic foam profiles are desired are incapable of being satisfied, due to the inability of thermoplastic foam profiles to be produced for such products in an economical, cost-effective manner. In addition to the limitations of the manufacturing process, the physical properties of the foam material is another constraint on its use, which is presently not being addressed by prior art constructions.

Typically, thermoplastic foam profiles or elongated members are constructed by a continuous extrusion process. In this process, the elongated foam profile or member produced incorporates a single, pre-determined cross-sectional shape or configuration. Although the cross-sectional shape or configuration can be widely varied by incorporating various production techniques, the foam profile or member produced must incorporate the same cross-sectional shape or configuration throughout the entire length of the profile/member.

Although this process accommodates the production of thermoplastic foam profiles/members which can be employed in numerous products and industries, other industries and products are incapable of enjoying the benefits of the thermoplastic foam profiles/members which are produced in a high volume and/or fully automated production operation, due to requirements for products which cannot employ a profile having a uniform, longitudinally extending, cross-sectional shape or configuration.

In addition, prior art products typically incorporate uniform physical and structural characteristics throughout the product and are incapable of having enhanced or varied physical or structural properties at desired locations.

Consequently, it is a principal object of the present invention to provide a method for producing uniquely constructed thermoplastic foam profile configurations in a fully automated and high volume production operation wherein the foam profile configurations are incapable of being directly produced by extrusion.

Another object of the present invention is to provide a method for producing uniquely constructed thermoplastic foam profile configurations, having the characteristic features described above, which is adaptable for enabling virtually any desired configuration to be achieved, while also enabling any desired sections or portions of the product to possess enhanced or varied structural, physical, and/or aesthetic features or characteristics.

Another object of the present invention is to provide a method for producing uniquely constructed thermoplastic foam profile configurations, having the characteristic features described above, which is capable of operating in a highly efficient and cost effective process.

Another object of the present invention is to provide a method for producing uniquely constructed thermoplastic foam profile configurations, having the characteristic features described above, which is capable of operating with a minimum of scrap material being produced.

Another object to the present invention is to provide a method for producing uniquely constructed thermoplastic foam profile configurations, having the characteristic features described above, which is capable of operating on a continuous, high-volume production operation.

Other and more specific objects will in part be obvious and will in part to appear hereinafter.

SUMMARY OF THE INVENTION

By employing the teaching of the present invention, all of the difficulties, drawbacks, and inabilities of prior art constructions have been overcome, and a new, unique, fully integrated enhanced foam manufacturing system is attained which is capable of producing virtually any desired foam product, with each product incorporating any desired area or zone being formed with a particular physical, structural, and/or aesthetic property, characteristic, or enhancement. In addition, in accordance with the teaching of the present invention, any desired cross-sectional shape or configuration is capable of being manufactured in fully automated, high volume, rapid production conditions, with virtual ease and simplicity, with a specific physical, structural, or aesthetic property incorporated therein.

In the preferred embodiment of the present invention, the fully integrated, enhanced foam manufacturing system of the present invention employs a unique product enhancing step which enables any desired section, portion, or element of the product being produced to be treated in a manner to provide the desired enhanced physical, structural, and/or aesthetics characteristics. In this regard, in accordance with the present invention, the desired foam product is produced by employing direct extrusion, extrusion welding, and/or any other desired manufacturing operation, with the resulting product being treated by applying a plurality of product enhancing elements directly into the foam product in the precisely desired areas or zones in which the enhancement is sought. In this way, each product is produced with specific areas or zones having the enhanced physical, structural, and/or aesthetic characteristics properties or enhancements as desired by the end-user.

In one preferred construction of the present invention, the product enhancing elements comprise a plurality of separate and independent pins, needles, rods, metal elements, and/or other small diameter puncturing members mounted on a carrier in cooperating relationship with each other for being forced into the foam product along a particular zone or section of the product. In this regard, the pins, needles, rods, metal elements, and/or other small diameter puncturing members are forced into the product in a particular, predetermined depth and frequency in order to produce the desired enhancement. Furthermore, any desired adjustment or change can be made in the location of the puncturing contact of the puncturing member with the foam product for further enhancing the final results.

Furthermore, the spaced distance between the plurality of pins, needles, rods, metal elements, and/or other small diameter puncturing members is also predetermined, depending upon the desired enhancement being sought. In addition, if desired, the puncturing of the desired product can be achieved using any desired alternate puncturing means, such as pneumatic bursts of air, rapid fire pneumatic guns, and the like.

In accordance with the present invention, it has been found that foam products formed in a wide variety of configurations such as enlarged sheets, cylindrically shaped profiles, and enlarged blocks, are able to have any desired portion, surface, or section of the product enhanced by providing a specifically desired enhanced physical, structural, and/or aesthetic characteristic thereto. In this way, a wide variety of foam products are achieved which are capable of being employed in areas where foam products were incapable of being effectively used, as well as providing foam products which are capable of achieving performance results which were previously unattainable. As a result, the present invention achieves the production of foam products which greatly advances the use and applicability of these products in numerous areas where such products have previously been incapable of being employed. In addition, the present invention is able to product products with physical characteristics, such as softness, bendability, pliability, and the like, which such products did not previously possess.

In addition, the foam products in which the present invention can be employed includes foam products manufactured from virtually any thermoplastic material. In general, the thermoplastic material can comprise one or more selected from the group consisting of polystyrenes, polyolefins, polyethylenes, polybutanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, copolymers of polypropylene, polyvinyl chloride, polyvinylidene chloride, polylactic acid polymers, and chlorinated polyolefines.

One area in which the product enhancing manufacturing system of the present invention has been found to be particularly applicable is in the manufacture of mattresses. In this regard, prior to the present invention, inner spring mattresses are produced by positioning a thick border wire peripherally surrounding the outer edge of the pre-constructed inner spring assembly. This thick border wire must be manually affixed to each of the spring coils defining the outer peripheral edge of the inner spring assembly, thereby requiring substantial expenditure of manual effort and material costs. Although various attempts have been made to eliminate the need for this border wire, these prior attempts have failed to provide a commercially viable solution and inner springs typically must incorporate the outer peripherally surrounding wire.

In accordance with the present invention, an enlarged profile pad, which is presently produced and employed for being placed directly below the inner spring assembly, is constructed in an enhanced manner which effectively eliminates the need for the border wire. In this regard, the enlarged profile pad is constructed using the enhanced manufacturing system of the present invention by exposing the profile pad to a controlled puncturing operation in which a desired section or portion of the pad is exposed to the application of a plurality of pins, rods, and/or needles mounted to a support member.

In one preferred construction and operation, a plurality of pins, rods, and/or needles are mounted to a small diameter circular shaped wheel and constructed for radially extending from the surface of the wheel. By mounting the pin supporting wheel member to a holding rod in a manner which enables the wheels to freely rotate relative to the rod, and controllably advancing the pin, rod, and/or needle supporting wheel along a preselected portion of the profile pad, the precisely desired section of the profile pad is effectively treated with the puncturing operation. By causing the pin, rod, and/or needle supporting wheel to roll over the desired section to be treated, with each pin, rod, and/or needle being forced into the profile pad to a preselected depth, the physical characteristics of the profile pad along the punctured section is effectively altered.

It has been found that by employing the present invention, the rigid and non-pliable material typically employed for profile pads used in connection with the inner spring assemblies, such as polyethylene, is effectively altered and/or enhanced by the puncturing operation. In this regard, the section of the profile pad which is exposed to the puncturing operation in accordance with the present invention becomes flexible, enabling the free bending or arcuate movement of the profile pad material relative to the punctured zone. Furthermore, any of the thermoplastic materials, as detailed above, can be employed with equal efficacy.

As a result, in accordance with the present invention, the puncturing operation is applied to a longitudinally extending area on each edge of the profile pad, directly adjacent and inwardly spaced from the terminating edge of the profile pad. In this way, each of the side edges of the profile pad is able to be arcuately pivoted relative to the profile pad itself, in a generally hinge-like manner, thereby enabling the edges of the profile pad to be wrapped about the outer peripheral edge of the inner spring assembly.

In this way, the prior art requirement for thick border wire is eliminated, and the profile pad, which is typically employed as the bottom surface of the inner spring assembly, is capable of also functioning as the border wire, by merely pivoting the edges of the profile pad upwardly into engagement with the plurality of springs forming the outer peripheral edge of the inner spring assembly. In this way, substantial manual effort and significant material costs are is eliminated during the production operation and both enhanced savings and product improvements are realized.

In an alternate embodiment of the present invention, a foam profile produced by extrusion and incorporating a generally cylindrical cross-sectional shape can be enhanced by employing the present invention. Cylindrically shaped foam profiles are common and are produced for use in a wide variety of alternate applications. Using the product enhancing manufacturing system of the present invention, it has been found that cylindrically shaped foam products, whether hollow or solid in cross-section, are enhanced by puncturing the outer peripheral surface of the foam profile in one or more locations. Preferably, the puncturing operation is performed in a circular shaped band or section peripherally surrounding the entire profile.

By employing the puncturing system of the present invention, the peripherally surrounding band or section of the profile is enhanced with an altered physical, structural, and/or aesthetic characteristic or attribute. In this regard, it has been found that by puncturing an elongated cylindrically shaped profile member in a plurality of separate and independent circular shaped, peripheral bands, the elongated cylindrical profile incorporates sections which are capable of being compressed and/or expanded more easily than is otherwise attainable. As a result, the cylindrical profile is able to exhibit enhanced spring life or compression and recovery characteristics which were previously unattainable.

In a further alternate embodiment of the present invention, a foam block can be treated with the puncturing enhancing system of the present invention to impart a softer, more flexible and compressible surface to the foam block. In this way, enhanced structural physical characteristics are provided to the foam block which previously were incapable of being realized.

It has also been found that the present invention can be employed for imparting aesthetic features into any desired product, such as colors, aromas, and the like. In providing a desired product with these aesthetic enhancements, it has been found that coloring liquids, fragrance enhancing compositions, and other product enhancing features, can be added to any desired product through the pins, needles, and/or rods being employed for the puncturing operation.

In this regard, while simultaneously puncturing the desired product, the enhancing materials can be injected through the needles directly into the product, to provide the enhanced result. In this way, a highly efficient production system is realized, while also enabling products to be enhanced in a manner previously unattainable.

The invention accordingly comprises the several steps and the relation of one or more such steps with respect to each of the others, and the article possessing the features, properties, and relation of elements which are exemplified in the following detailed disclosure, and the scope of the invention will be indicated in the claims.

THE DRAWINGS

For a fuller understanding of the nature and objects of the invention, reference should be had to the following detailed description taken in connection with the accompanying drawings, in which.

DETAILED DISCLOSURE

By referring to FIGS. 1-10, along with the following detailed discussion, the construction and operation of the product enhancing manufacturing system and the resulting products produced thereby can best be understood. In this regard, although FIGS. 1-10 and the following detailed discussion provide several alternate embodiments of the present invention, these embodiments are provided for exemplary purposes only and are not intended as a limitation of the present invention. Consequently, variations and alterations in the manufacturing system and products that are able to be produced using the teaching of the present invention are intended to be encompassed within the scope of the present invention.

Figure 1:
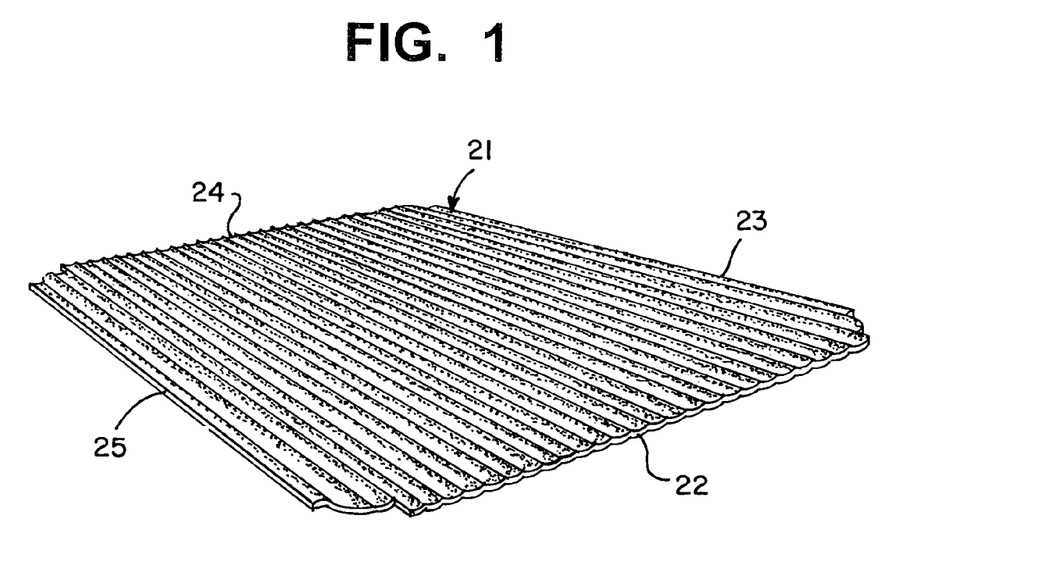
FIG. 1 is a perspective view of an extruded or welded foam profile pad prior to the use of the present invention.

In FIG. 1, enlarged extruded foam profile pad 21 is depicted which is produced and typically employed in the manufacture of mattresses. In its normal construction, profile pad 21 is employed as the bottom layer of a mattress and is used for receiving and securely retaining the bottom surface of an inner spring assembly. However, as discussed above, typically, prior art mattress manufacturing requires the incorporation of a thick border wire peripherally surrounding the inner spring assembly.

As shown in FIG. 1, profile pad 21 incorporates side edges 22, 23, 24, and 25 which define the other perimeter of pad 21. In its present form, profile pad 21 comprises material which is rigid in order to provide the qualities desired for a profile pad in the finished product. Typically, the material employed is polyethylene. However, due to the inherent characteristics of this material, pad 21 is incapable of easily flexing or bending.

In addition, the material employed for profile pad 21 may comprise any desired thermoplastic material. In this regard, the thermoplastic material employed comprises one or more selected from the group consisting of polyethylenes, polybutanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, copolymers of polypropylene, polyvinyl chloride, polyvinylidene chloride, polylactic acid polymers, and chlorinated polyolefines.

Figure 2:
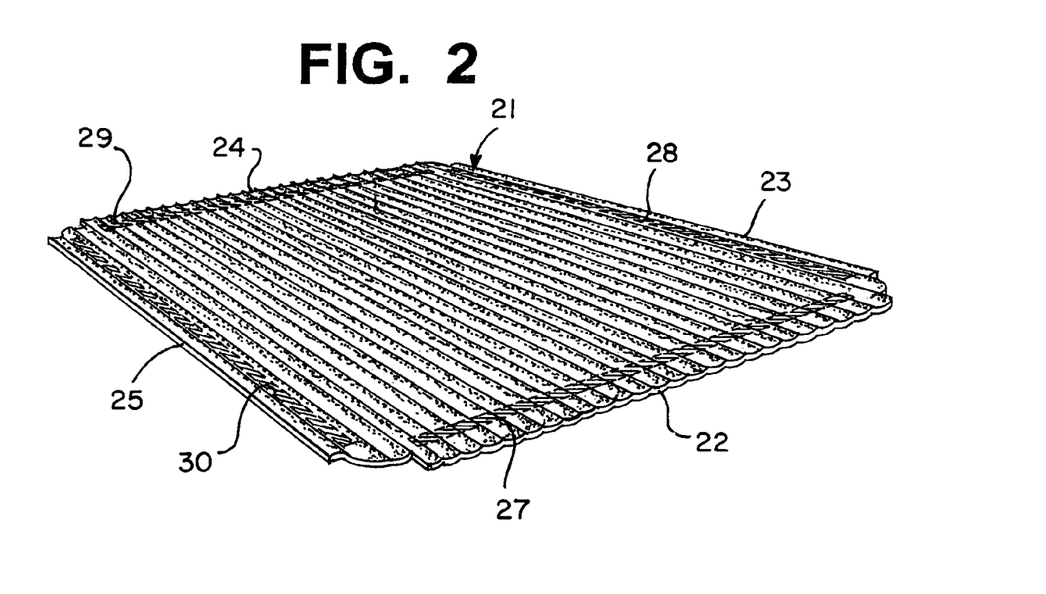
FIG. 2 is a perspective view of the extruded or welded foam profile pad of FIG. 1 after the creation of longitudinally extending enhanced zones being formed therein by employing the present invention.

In FIG. 2, enlarged extruded foam profile pad 21 is depicted after the use of the product enhancing manufacturing system of the present invention. As shown in FIG. 2, pad 21 now incorporates four separate and distinct elongated enhanced zones 27, 28, 29, and 30, each of which are formed along one side edge of pad 21. As depicted, enhanced zones 27, 28, 29, and 30 are formed adjacent edges 22, 23, 24, and 25, with each enhanced zone being spaced inwardly from the edge associated therewith.

By incorporating enhanced zones 27, 28, 29 and 30 in profile pad 21, each enhanced zone 27, 28, 29 and 30 alters the physical characteristics of the pad along the enhanced zone, enabling the pad to be easily foldable along enhanced zones 27, 28, 29 and 30. In this way, as is more fully detailed below, foam profile pad 21 when manufactured by employing the product enhancing manufacturing system of the present invention is able to be used in association with the inner spring assembly, eliminated the need for the thick border wire.

Figure 3:
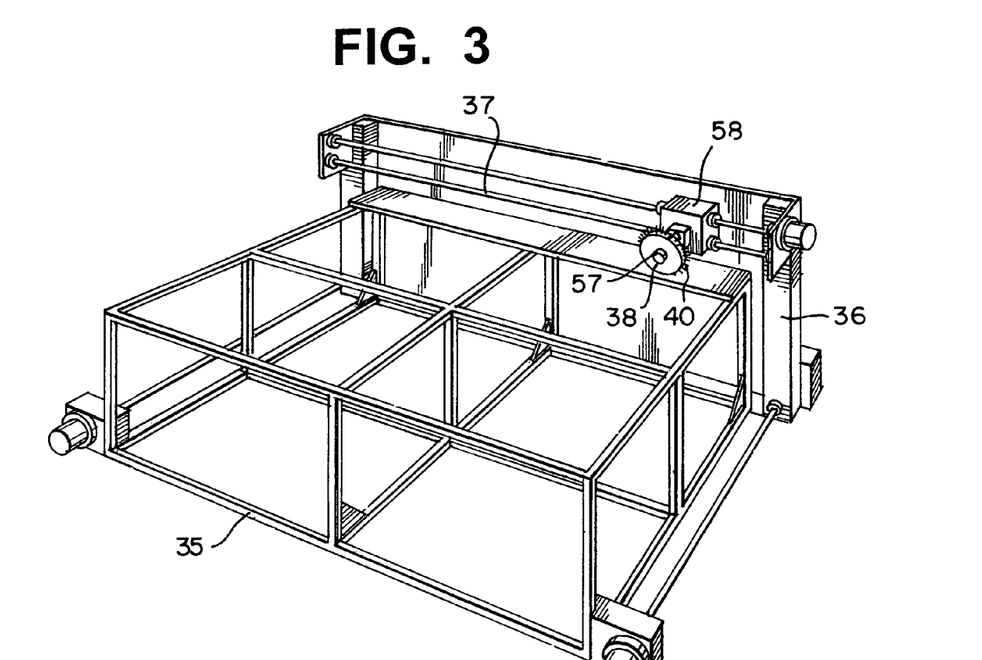
FIG. 3 is a perspective view of one embodiment of the manufacturing equipment employed in forming the profile pad of FIG. 2.
Figure 4:
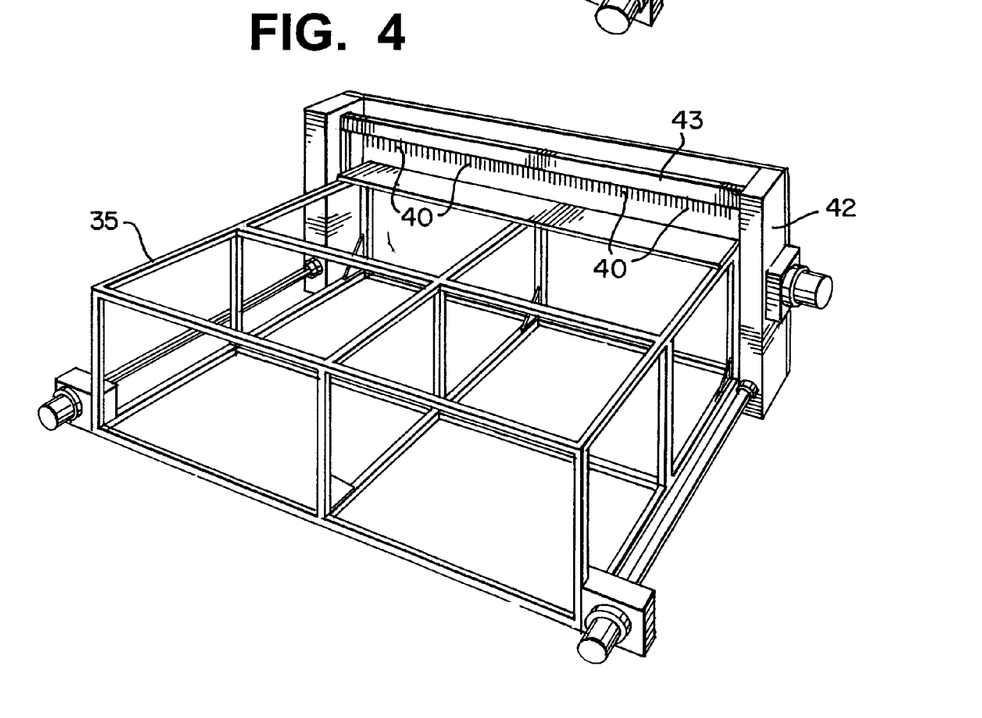
FIG. 4 is a perspective view of an alternate embodiment of the manufacturing equipment employed in forming the profile pad of FIG. 2.

In order to best understand the product enhancing manufacturing system of the present invention as it is applied to foam profile panel 21, reference should be made to FIGS. 3 and 4, along with the following detailed discussion. As depicted in each of these Figures, supporting base 35 is constructed for receiving and supportingly retaining enlarged, extruded foam profile pad 21. In addition, in the embodiment depicted in FIG. 3, a frame assembly 36 is mounted at one end of base 35 and incorporates a horizontally extending rod 37. Furthermore, roller wheel 38 is mounted to rod 37 in a manner which enables roller wheel 38 to move longitudinally along the entire length of rod 37.

Figure 10:
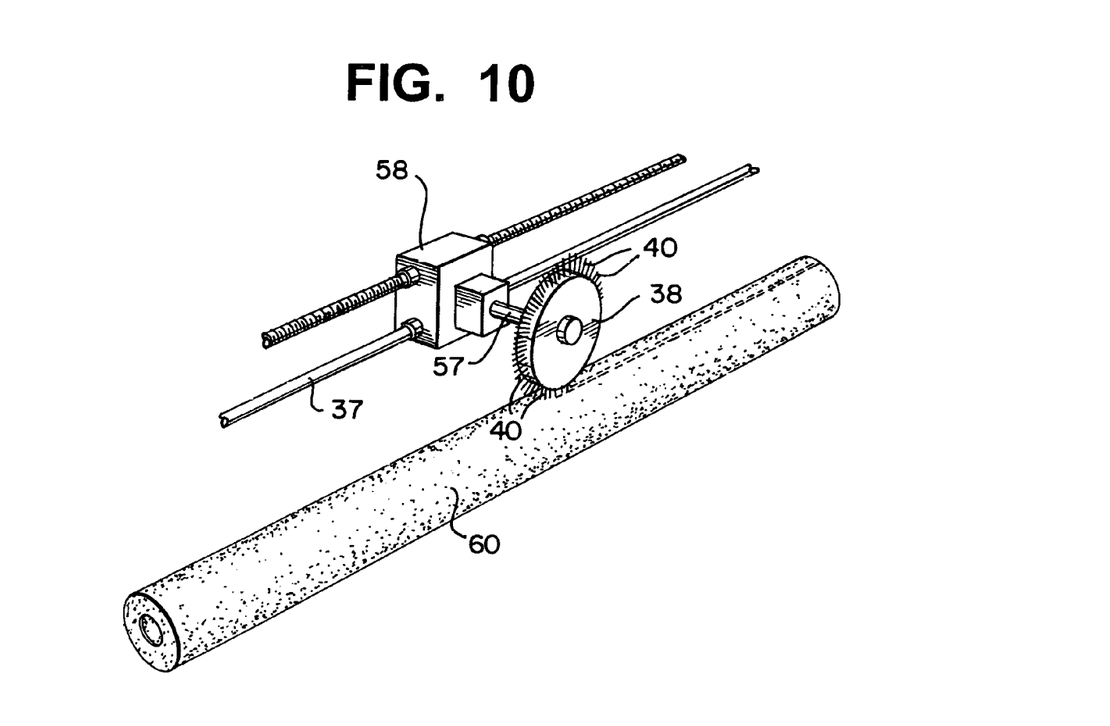
FIG. 10 is a perspective view of further manufacturing equipment employing the present invention for providing composite injection of desired material into the product.

In the preferred construction of the present invention, roller wheel 38, an example of which is shown in FIG. 10, incorporates a plurality of pins, needles, and/or small diameter rods 40 mounted to the outer peripheral surface of roller wheel 38 for radially extending outwardly therefrom. By employing this construction, whenever desired, roller wheel 38 is longitudinally advanced along rod 37, causing roller wheel 38 to contact profile pad 21 mounted to support base 35 and forcing pins, needles, and/or small diameter rods 40 into the surface of profile pad 21.

By controlling the position of elongated rod 37 relative to the top surface of pad 21, the depths of penetration of pins, needles, and/or rods 40 into profile pad 21 is controlled. Furthermore, by controlling the number of times or frequency roller wheel 38 is advanced along rod 37, the precisely desired enhanced physical characteristics are delivered to profile pad 21.

Once one enhanced zone is formed along one edge of profile pad 21, the remaining enhanced zones are formed along the remaining edges following the identical process. In this way, enhanced zones 27, 28, 29, and 30 are each formed along profile pad 21. Once completed, profile pad 21 has the precisely desired construction for enabling edges 22, 23, 24, and 25 to be arcuately pivoted along enhanced zones 27, 28, 29 and 30 to engage the bottom edge of the inner spring, thereby securely affixing profile pad 21 in the precisely desired position.

In FIG. 4, an alternate construction for forming enhanced zones 27, 28, 29, and 30 in profile pad 21 is depicted. In this embodiment, support base 35 is constructed for cooperating with frame assembly 42. In addition, frame assembly 42 incorporates an elongated support bar 43 mounted thereto and constructed for moving vertically relative to frame 42. In addition, elongated support bar 43 incorporates a plurality of pins, needles, and/or small diameter rods 40 mounted to the bottom surface thereof extending outwardly therefrom. As a result, by vertically moving support bar 43 relative to frame assembly 42, the plurality of pins, needles, and/or small diameter rods 40 are forced into profile pad 21 mounted on support base 35. By repeatedly moving bar 43 vertically into pad 21, the desired enhanced zones 27, 28, 29, and 30 are formed in profile pad 21.

As shown in FIGS. 1 and 2, profile pad 21 is preferably constructed with a saw-tooth, cross-sectional configuration. Although this construction is preferred for use as a spring support, any alternate construction and/or cross-sectioned shape or configuration can be employed with equal efficacy. In addition, in order to obtain pad 21 having the desired overall dimensions, who or more extrusions can be welded together as needed.

Figure 5:
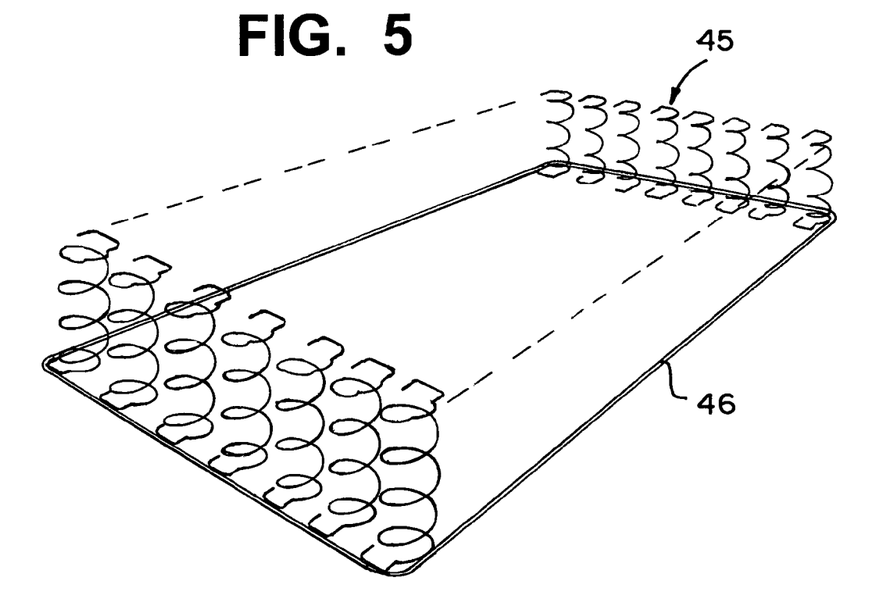
FIG. 5 is a perspective view depicting a conventional mattress inner spring assembly in combination with a border wire mounted thereto.
Figure 6:
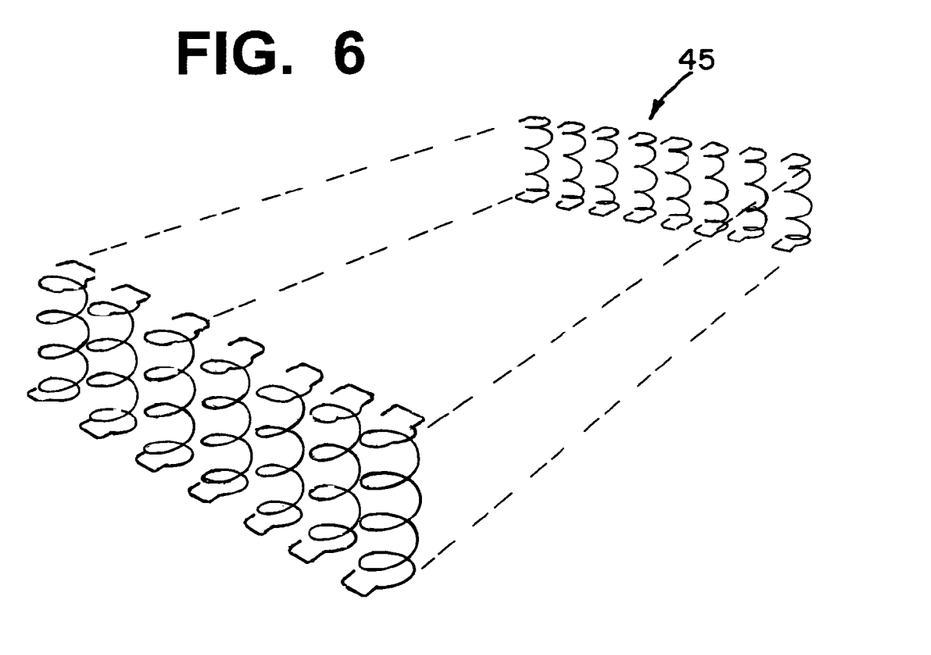
FIG. 6 is a perspective view of a conventional mattress inner spring assembly.
Figure 7:
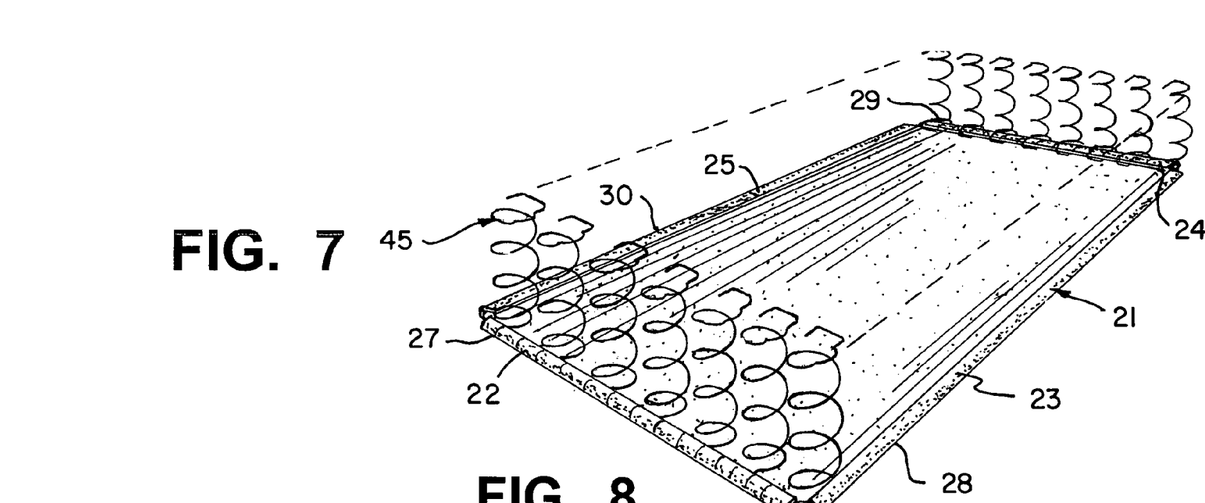
FIG. 7 is a perspective view of a mattress inner spring assembly in combination with the enhanced profile pad of the present invention.

By referring to FIGS. 5-7, the use of this embodiment of the present invention can best be understood. As shown in FIG. 5, inner spring assembly 45 is depicted along with thick border wire 46 shown mounted in place. As discussed above, border wire 46 is affixed to each spring coil formed in the outer peripheral edge of inner spring assembly 45. However, by employing the present invention, the need to employ border wire 46 is eliminated and inner spring assembly 45 can be employed as shown in FIG. 6.

In FIG. 7, profile pad 21 is depicted fully assembled with inner spring assembly 45. In this regard, as discussed above, profile pad 21 is formed with enhanced zones 27, 28, 29, and 30 formed adjacent side edges 22, 23, 24, and 25, enabling the side edges to be arcuately pivoted into secure interengagement with each of the spring coil elements incorporated into the spring assembly 45 along the outer peripheral edge thereof. Due to the physical characteristics of profile pad 21, the inherent rigidity and strength of profile pad 21 enables the folded interengagement of side edges 22, 23, 24, and 25 with the inner spring assembly 45 to be sufficient for constructing a final assembly in the desired manner. In this way, the need for border wire 46 is totally eliminated and a full, complete, inner spring assembly is realized in a rapid and easily achieved manner.

As depicted in FIG. 7, the arcuate pivoting movement of side edges 22, 23, 24, and 25 into engagement with inner spring assembly 45 causes enhanced zones 27, 28, 29, and 30 to be physically wrapped around the base of each of the coil spring members forming the outer peripheral surface of inner spring assembly 45. This wrapped interengagement of profile pad 21 with the spring coil members provide the desired cooperative interengagement of the coil members, without the need for border wire 46. As result, substantial manual effort in the production operation is completely eliminated.

Figure 8:
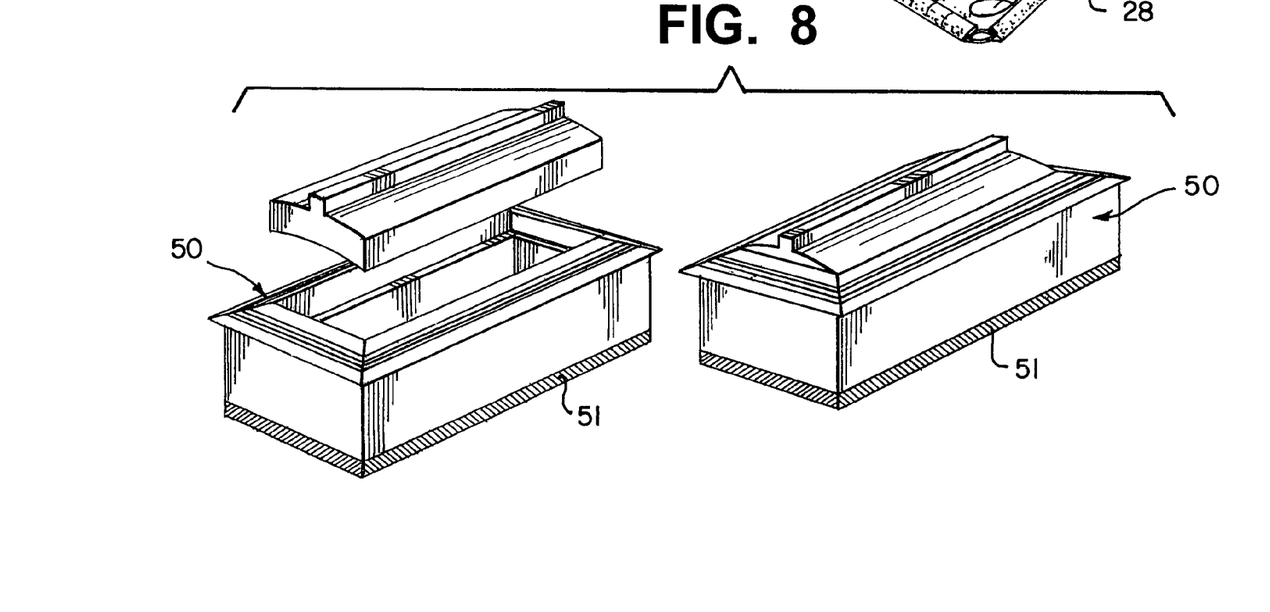
FIG. 8 is a perspective view of an alternate embodiment of the present invention wherein a foam block has been enhanced in accordance with the present invention.

In FIG. 8, the use of the present invention in an alternate product is fully depicted. In this embodiment, housing 50 is shown formed from polyethylene material in a generally block or rectangular shape. Typically, the physical characteristics of housing 50 in regard to its flexibility and compressibility are completely limited by the inherent attributes of the polyethylene material.

By employing the present invention, any desired area of block 50 can be enhanced with the physical characteristics of block 50 being controllably altered. As depicted, lower edge or surface 51 of block 50 is enhanced by the application of the present invention in order to enable edge/surface 51 to be compressible, and possess a softer, more flexible physical characteristic, such as is required for gasket materials.

In order to produce block 50 with lower edge/surface 51 incorporating the desired physical characteristics, either roller wheel 38 with pins, needles, and/or rods 40 extending therefrom or elongated support bar 43 with pins, needles, and/or rods 40 extending therefrom is employed. Alternatively, any other support system incorporating a plurality of pins, needles, and/or rods constructed in a manner to achieve the desired puncturing of block 50 may be employed.

Regardless of the production equipment employed, lower edge/surface 51 of block 50 is exposed to repeated puncturing by a plurality of pins, needles, and/or rods to a desired depth. By repeatedly exposing lower edge/surface 51 to the penetration of the plurality of pins, needles, and/or rods, the physical characteristics normally associated with housing 50 are altered and lower edge/surface 51 is formed with a softer, compressible, enhanced physical structure to the depth desired by the user. In this way, the present invention is easily employed for achieving unique enhanced results previously unattainable for such products as a gasket and other such products.

Figure 9:
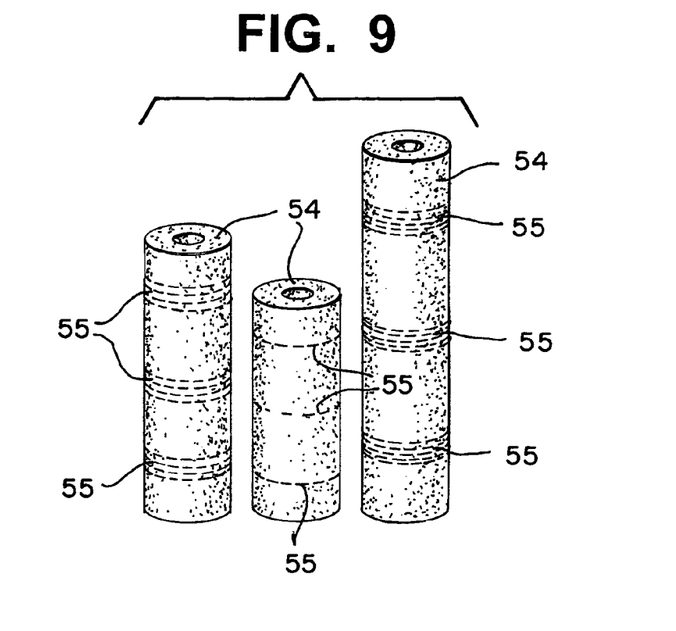
FIG. 9 is a perspective view of a plurality of tube members which have been enhanced in accordance with the present invention.

In FIG. 9, a further alternate embodiment of the present invention is shown. In this embodiment, elongated, cylindrically shaped tube member 54 is depicted with a plurality of punctured bands 55 formed in the outer peripheral surface thereof in longitudinally spaced locations. In accordance with the present invention, any desired number of bands 55 can be formed in the outer surface of tube member 54, with each band being spaced away from an adjacent band by a desired longitudinal distance. In the preferred embodiment, bands 55 are formed in tube member 54 peripherally surrounding tube member 54 in a generally circular pattern. However, if desired, any other pattern, configuration, or spacing can be employed, such as spiral bands, diamond strips, etc., as well as forming enhanced zones or punctured zones in various alternate directions for achieving any desired physical, aesthetic, or structural enhancement.

In the embodiment depicted in FIG. 9, tube member 54 is enhanced by forming bands 55 in the other surface thereof to a desired depth which enables tube member 54 to incorporate sections of enhanced compressibility in the areas in which bands 55 are formed. As depicted, by employing the present invention, a substantially reduced compressive force may be applied to the ends of tube member 54 for longitudinally compressing tube member 54 in its entirety. Due to the incorporation of a plurality of bands 55 in tube member 54, with each band 55 reducing the inherent strength or rigidity of tube member 54 in the specific area only, a softer, more compressible zone is produced which enables tube member 54 to be more easily compressed longitudinally or axially.

In addition, it is also depicted in FIG. 9, the incorporation of bands 55 in tube member 54 also enables tube member 54 to be less resistant to longitudinal or axial expansion. In this way, whenever pulling force is applied longitudinally or axially to tube member 54, tube member 54 is able to be elongated more easily, due to the softer, force resistant portions created by bands 55. As a result, by employing the present invention, a unique construction is realized for tube member 54 which previously was unattainable.

In FIG. 10, an alternate embodiment of the present invention is depicted. In this embodiment, a desired aesthetic, structural, or physical enhancement is added to a desired component by injecting material into the desired product 60. In this embodiment, roller wheel 38 is employed incorporating a plurality of radially extending pins, needles, and/or rods 40, as discussed above. In this particular embodiment, however, pins, needles, and/or rods 40 each incorporate elongated channels or cavities formed therein to enable the desired material to flow through pins, needles, and/or rods 40 into the desired product 60.

In addition, roller wheel 38 is mounted to a support shaft 57 which is rotationally driven by a drive assembly mounted in housing 58. Furthermore, housing 58 also incorporates the desired material which is delivered through shaft 57 into roller wheel 38 and pins, needles, and rods 40 for delivery to product 60. Finally, housing 58 is mounted to elongated rod 37 for longitudinal movement along rod 37 for enabling roller wheel 38 to transverse product 60 and deliver the desired enhancement thereto. Furthermore, if desired, roller wheel 38 may be constructed for puncturing product 60 to any desired depth, in order to simultaneously provide products 60 with enhanced physical or structural characteristics as described above.

As shown in FIG. 10, product 60 comprises an elongated, substantially cylindrically shaped tube member in the process of having a desired material injected into a longitudinally extending portion or section thereof. In this regard, the material injected into products 60 may be selected from a wide variety of materials, such as colors, fragrances, adhesives, and the like.

Regardless of the type of material employed, the concept of enabling product 60 to be quickly and easily enhanced in a longitudinally extending section by injecting the desired material directly into product 60 represents a unique advance over prior art systems, which have been incapable of producing a product of this nature in an easily constructed, and easily manufactured operation. Furthermore, as discussed above, the physical and/or structural characteristics of product 60 can also be enhanced by simultaneously puncturing the longitudinally extending section to deliver the desired enhanced area.

It will thus be seen that the objects set forth above, among those made apparent from the preceding description, are efficiently attained and, since certain changes may be made in carrying out the above process and in the article set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim is new and desire to secure by Letters Patent is:

1. A process for forming a combined wire retaining and spring assembly support plate having a generally rectangular shape defined by four adjacent edges, said process comprising the steps of:
  A. extruding an enlarged, substantially flat panel formed of foamed thermoplastic material and dimensioned for being positioned in supporting, underlying engagement with a mattress inner spring assembly;
  B. forming a first elongated, longitudinally extending enhanced zone along a first edge of the panel, said first enhanced zone being spaced inwardly from said first edge, and thereby forming a first spring retaining section between the first enhanced zone and the first edge of the panel;
  C. forming a second elongated, longitudinally extending enhanced zone along a second edge of the panel, said second enhanced zone being spaced inwardly from said second edge, and thereby forming a second spring retaining section between the second enhanced zone and the second edge of the panel;
  D. positioning a fully constructed mattress inner spring assembly on said enlarged, substantially flat panel with the outer peripheral edge of said inner spring assembly being positioned inwardly of the first and second enhanced zones;

E. arcuately pivoting the first spring retaining section relative to the first enhanced zone for engaging the first spring retaining section with the inner spring assembly positioned adjacent said first edge; and F. arcuately pivoting the second spring retaining section relative to the second enhanced zone for engaging the second spring retaining section with the inner spring assembly positioned adjacent said second edge, thereby securely mounting the inner spring assembly to the supporting panel for providing spring retaining interengagement therewith.

2. The process for forming a combined wire retaining and spring assembly supporting support plate defined in claim 1, comprising the additional steps of:

G. forming a third elongated, longitudinally extending enhanced zone along a third edge of the panel, said third enhanced zone being spaced inwardly from said third edge and simultaneously forming a third spring retaining section between the third enhanced zone in the third edge of the panel;

H. forming a fourth elongated, longitudinally extending enhanced zone along a fourth edge of the panel, said fourth enhanced zone being spaced inwardly from said fourth edge and simultaneously forming a fourth spring retaining section between the fourth enhanced zone in the fourth edge of the panel; and I. arcuately pivoting the third and fourth spring retaining sections relative to the third and fourth enhanced zones for engaging in the third and fourth spring retaining sections with the inner spring assembly positioned adjacent the third and fourth edges, thereby peripherally surrounding the mattress inner spring assembly in its entirety and retaining the spring assembly in secure interengagement with the panel member.

3. The process for forming a combined wire retaining and spring assembly supporting support plate defined in claim 2, wherein each of the steps for forming the first, the second, the third and the fourth enhanced zones are further defined as comprising the application of a holding member to the panel along the area defining the enhanced zone, said holding member being constructed with a plurality of one or more selected from the group consisting of pins, needles, and rods, extending outwardly therefrom.

4. The process for forming a combined wire retaining and spring assembly supporting support plate defined in claim 3, the forming of the enhanced zone further defined as being achieved by repeatedly forcing the pins, needles, or rods of the holding member into the panel throughout the desired area.

5. The process for forming a combined wire retaining and spring assembly supporting support plate defined in claim 4, wherein said holding members are further defined as comprising one selected from the group consisting of wheels, elongated bars, and rods.

6. The process for forming a combined wire retaining and spring assembly supporting support plate as defined in claim 3, wherein the holding means is further defined as being mounted in cooperating relationship with a support surface constructed for securely holding the support plate and enabling the holding means to be moved relative to the support plate in a manner which causes the pins, needles, or rods extending therefrom to be forced into the support plate for forming the enhanced zone.

7. The process for forming a combined wire retaining and spring assembly supporting support plate defined in claim 1, wherein the panel is further defined as comprising one or more selected from the group consisting of polyethylenes, polybutanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, copolymers of polypropylene polyvinyl chloride, polyvinylidene chloride, polylactic acid polymers, and chlorinated polyolefines.

8. The process for forming a combined wire retaining and spring assembly supporting support plate defined in claim 7, wherein the panel is further defined as being formed from polypropylene.

\* \* \* \* \*